United States Patent [19]

Cahill

[11] Patent Number: 5,609,383
[45] Date of Patent: Mar. 11, 1997

[54] VEHICLE LINER UNDERNEATH VEHICLE FLOOR

[75] Inventor: John W. Cahill, Fulton County, Ga.

[73] Assignee: National Shelter Products, Inc., Issaquah, Wash.

[21] Appl. No.: 512,515

[22] Filed: Jul. 20, 1995

[51] Int. Cl.$^6$ ................................................ B60R 13/00
[52] U.S. Cl. .......................... 296/39.1; 220/403; 220/470; 296/38
[58] Field of Search .................................. 296/39.1, 182, 296/204, 39.2, 39.3, 38, 183; 180/69.22, 69.23, 69.25; 280/770, 851; 220/403, 408, 410, 470

[56] References Cited

U.S. PATENT DOCUMENTS 3,481,643  12/1969  Campbell ............................... 296/204
4,186,845  2/1980  Podd ..................................... 296/39.1 X

*Primary Examiner*—David M. Mitchell
*Assistant Examiner*—Kia M. Robinson
*Attorney, Agent, or Firm*—Flynn, Thiel, Boutell & Tanis, P.C.

[57] ABSTRACT

A liner for a vehicle is provided between the vehicle's floor and frame and protects the underside of the floor from moisture coming from underneath the vehicle. The liner also has a drainage feature which allows for liquids trapped between it and the floor to drain therethrough. The vehicle liner is made up of a pair of strips of a waterproof material disposed adjacent to each other with a gap provided between them and a third strip of a waterproof material covering the gap. The three strips effectively remove liquids from underneath the vehicle floor and yet form a moisture barrier for preventing moisture arising from underneath the vehicle from contacting with the vehicle floor.

18 Claims, 2 Drawing Sheets

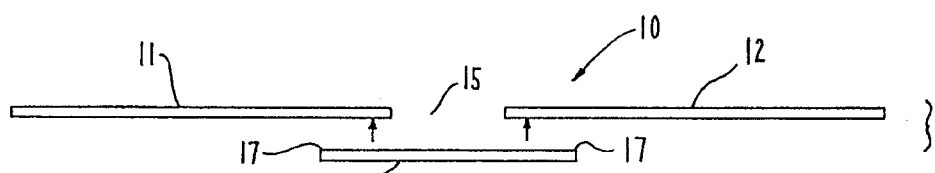
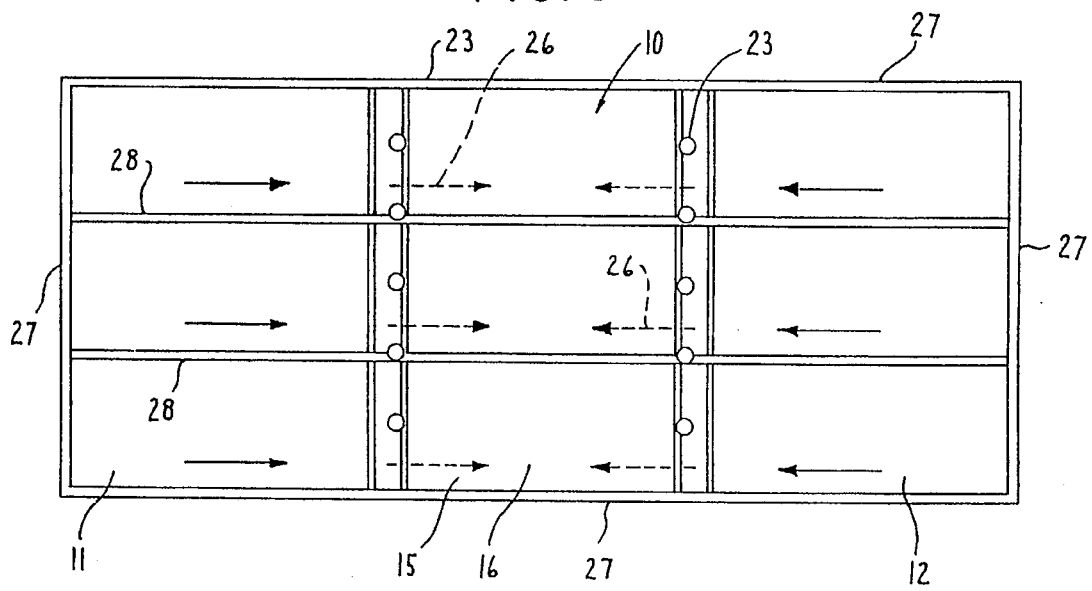

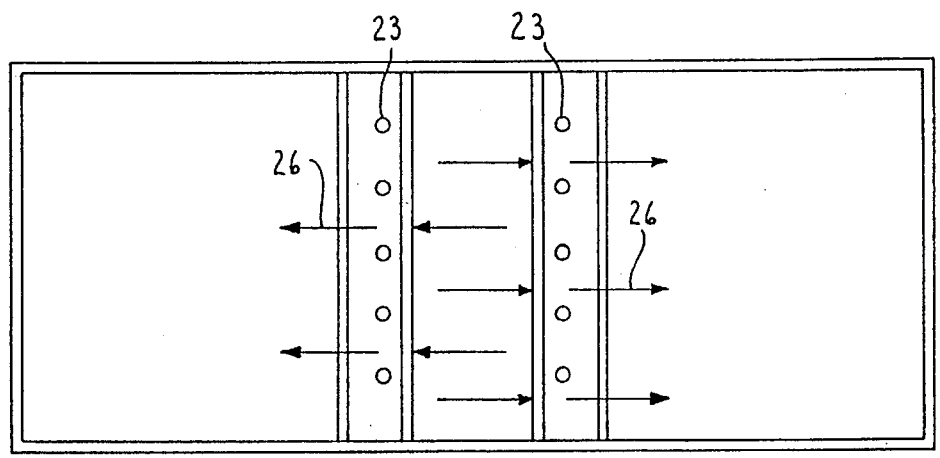
FIG. 4
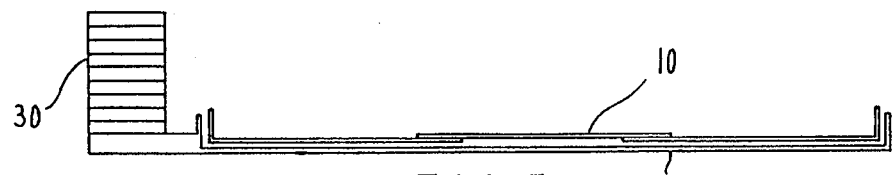
FIG. 5
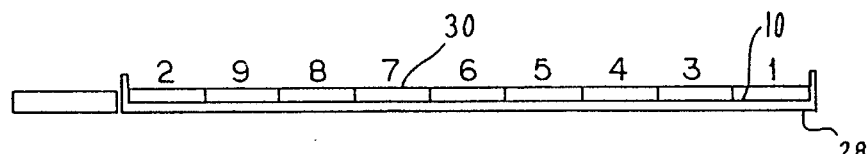
FIG. 6
FIG. 7
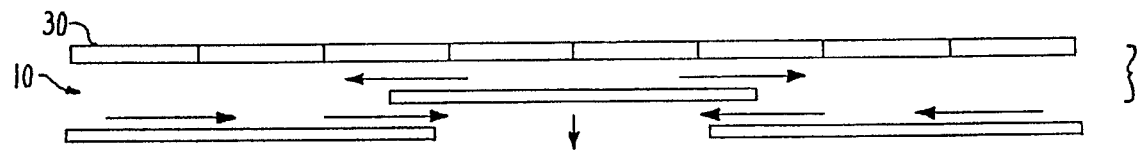
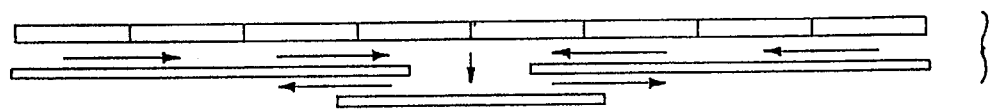
FIG. 8

VEHICLE LINER UNDERNEATH VEHICLE FLOOR

BACKGROUND OF THE INVENTION

In today's commerce, vehicles, such as truck trailers, are used in great part to ferry goods to a desired destination. These vehicles typically have an enclosed cargo area in which the transported goods are contained. The floors of these cargo areas may be made of wooden planks having spaces provided therebetween or some material which allows liquid accumulating in the cargo area to drain therefrom. However, problems exist during the hauling of the cargo in that when the vehicle is moving greater than a certain speed, a pressure differential may develop between the outside ambient atmosphere and the inside of the truck so that the pressure inside the truck is lower than atmospheric pressure. When this pressure differential reaches a certain level, the liquid outside the vehicle can be siphoned into the vehicle through the porous floor structure. If left unattended, this liquid can cause problems such as warping and/or rotting of the wooden floor and corrosion of a metallic floor.

In order to prevent the problems discussed above, it has been proposed to insert a waterproof liner between the vehicle floor and the vehicle frame which effectively blocks the entry of ambient moisture into the cargo bed. Although this waterproof liner solves the problem with respect to ambient moisture entering into the cargo area, it presents a new problem in that moisture that may be contained in the cargo area could drain through the floor and be trapped between the floor and the waterproof liner where it can damage the floor as discussed above.

It is therefore an object of the present invention to provide a waterproof liner which is provided between a vehicle's floor and frame which effectively prevents ambient moisture from entering into a vehicle's cargo area through its floor and yet allows moisture to drain from between the vehicle's floor and the waterproof liner.

It is also an object of the present invention to provide a vehicle cargo area having a waterproof liner disposed between the cargo area's floor and frame which effectively prevents the entry of ambient moisture into the vehicle cargo area yet allows moisture collected between the cargo area floor and the waterproof liner to drain therefrom.

It is still a further object of the present invention to provide a vehicle having a cargo area with a floor and a frame and a waterproof liner disposed between the floor and the frame which effectively prevents the entry of ambient moisture into the vehicle cargo area and yet allows moisture accumulated between the cargo area's floor and the waterproof liner to drain therefrom.

SUMMARY OF THE INVENTION

These and other objects of the present invention are achieved by providing a waterproof liner between a vehicle's floor and frame which is made up of adjacent strips of a waterproof material extending in parallel relationship along the vehicle's floor in a manner that a gap is formed therebetween and providing a third strip of a waterproof material extending along and covering the gap provided between the two strips of waterproof material in a manner that effectively prevents ambient moisture from entering in between the liner and the vehicle floor through the gap contained between the two strips of waterproof material and yet allows water to drain from between the liner and the floor through the gap. The liner is preferably made of a flexible waterproof material to allow easy installation and removal.

BRIEF DESCRIPTION OF THE DRAWINGS

FIG. 1 is an end view showing the relationship between the individual elements of a first embodiment of the liner of the present invention;

FIG. 2 is an end view showing the relationship between the individual elements of a second embodiment of the liner of the present invention;

FIG. 3 is a top view illustrating the relationship between the individual elements of the first embodiment of the liner of the present invention;

FIG. 4 is a top view illustrating the relationship between the individual elements of a second embodiment of the liner of the present invention;

FIG. 5 is an end view illustrating the first embodiment of the liner of the present invention disposed on a vehicle frame;

FIG. 6 is an end view of the liner of the present invention disposed between floor boards and the vehicle frame;

FIG. 7 is an end view illustrating the drainage pattern of the first embodiment of the liner of the present invention; and FIG. 8 is an end view illustrating the drainage pattern of the second embodiment of the liner of the present invention.

DETAILED DESCRIPTION

Referring now to FIG. 1, a liner 10 of the present invention is illustrated. The liner 10 is made up of a first strip 11 of a waterproof material and a second strip 12 of a waterproof material disposed adjacent and parallel to the first strip 11 so that a gap 15 of a substantially uniform width is provided therebetween. A third strip 16 of a waterproof material is positioned over the gap 15 and extends along the length thereof. The third strip 16 is of a width sufficient for its outer ends 17 to overlap the inner adjacent ends, 21, 22 of the first and second strips 11, 12.

Another embodiment of the liner 10 of the present invention is illustrated in FIG. 2. In this embodiment, the first and second strips 11, 12 are positioned as in the first embodiment so that a gap 15 is provided between them. In the second embodiment, however, the third strip 16 underlies the gap 15 as it extends along the length thereof. As with the first embodiment, the outer ends 17 of the third strip 16 overlap with the outer ends 21, 22 of the first and second strips 11, 12.

The composition of the first, second and third strips may be the same or different. It is desirable that the first, second and third strips are flexible and made up of a woven polymer, such as a woven thermoplastic resin. The woven thermoplastic resin can have a polymeric coating provided thereon in order to improve the hydrophilic properties of the woven polymer. A suitable thermoplastic resin for the woven polymer is a polyolefin such as polyethylene and polypropylene. The polymer coating can additionally be of a thermoplastic resin such as polyethylene and polypropylene. A suitable weave for adequate puncture resistance is a 12×12 count (yarns per square inch). Alternatively, the waterproof material can be in the form of unwoven sheets.

As shown in FIGS. 3 and 4, the third strip 16 can be attached to the first and second strips 11, 12 through the use of intermittent glue lines 23 so that the outer ends 17 of the third strip 16 are tacked to the inner ends 21, 22 of the first and second strips 11, 12 creating flow paths 26 through which moisture may exit. The type of glue or adhesive used is not critical and can be readily determined depending on the composition of the waterproof strips and the environment of use. Alternatively, the first, second and third strips 11, 12 and 16 can be positioned on one another as illustrated in FIGS. 1 and 2 without any adhesive being used. The moisture contained in the vehicle cargo area can exit via the liner of the present invention through the natural rolling motion associated with the vehicle travel and flexibility of the liner 10.

FIG. 3 illustrates how the liner 10 of the present invention can be oriented in a vehicle cargo area. This vehicle cargo area is bounded by four sidewalls 27 and longitudinally extending floor support beams 28. The first and second strips 11 and 12 are placed over the floor support beams 28 at opposed ends of the cargo area. The third strip 16 is then placed over the gap 15 formed between the first and second strips 11, 12 at a central portion of the cargo area. If it is desired to tack the third strip 16 to the first and second strips 11, 12, glue lines can be applied to the inner ends 21, 22 of the first and second strips either prior to their installation in the cargo area or after they have been placed on the support beams 28. Alternatively, the first, second and third strips 11, 12 and 16 can be longitudinally oriented in the vehicle cargo area.

FIG. 5 illustrates an end view of a cargo area having a liner 10 of the present invention contained therein. The liner can be pulled directly off a roll and over the support beams 28 as shown in FIG. 5. The liner is aligned so that the entire floor area is covered. Large wrinkles are removed by pulling the liner 10 taut in both the length and width directions. Floor boards 30 are placed directly over the liner 10 and slid to the opposing ends of the cargo area. The remaining floor boards 30 are then placed over the liner 10 in a manner such that the liner 10 is completely covered by the floor boards 30 as shown in FIG. 6.

As shown in FIGS. 7 and 8, when water seeps through the floor boards 30, it will move across the liner 10 toward the middle of the cargo area as the vehicle travels over banked roads. When the water crosses the center of the cargo area, it will flow out between the glue lines 23 via the flow paths 26 and onto the road. The overlap of the third strip 16 with the first and second strips 11, 12 and gravity make it difficult for moisture to enter into the cargo area via the liner. However, the present design enables air to freely circulate through the cargo area floor and promote rapid drying of any remaining dampness.

Although the above discussion requires the liner 10 to be placed between the floor and the frame of the vehicle, it is understood that the critical feature of the present invention is that the liner be placed underneath the vehicle floor. It is not necessary for the inventive liner to be supported by the vehicle frame, it may be attached directly to the floor by being nailed to or glued to the floor or by any other suitable method of securing the liner to the floor.

It is to be understood that the various forms of the invention illustrated and described herein are to be taken as preferred embodiments and that various changes in shape, material, size and arrangement of parts may be resorted to without departing from the spirit of the invention.

The embodiments of the invention in which an exclusive property or privilege is claimed are defined as follows:

1. A liner for preventing moisture from entering and removing moisture from underneath a vehicle's floor, said liner comprising a first strip of a waterproof material provided underneath the vehicle's floor, a second strip of a waterproof material provided underneath the vehicle's floor in spaced-apart, parallel relationship to said first strip so that a gap is provided therebetween and a third strip of a waterproof material provided underneath the vehicle's floor and covering the gap provided between said first and second strips, wherein means for removing moisture is provided between at least one of said first and third strips and said second and third strips.

2. The liner of claim 1, wherein said first, second and third strips are made of the same waterproof material.

3. The liner of claim 1, wherein said first, second and third strips extend longitudinally along the length of the vehicle's floor.

4. The liner of claim 1, wherein said first, second and third strips extend laterally along the width of the vehicle floor.

5. The liner of claim 1, wherein said third strip is tacked to said first and second strips.

6. The liner of claim 5, wherein said third strip is tacked intermittently to said first and second strips.

7. The liner of claim 1, wherein said vehicle is a truck trailer.

8. The liner of claim 2, wherein the waterproof material is a polymer.

9. The liner of claim 2, wherein the waterproof material is a woven polymer.

10. The liner of claim 8, wherein the polymer is a thermoplastic resin.

11. The liner of claim 10, wherein the thermoplastic resin is selected from the group consisting of polyethylene and polypropylene.

12. The liner of claim 9, wherein the woven polymer is coated with a polymeric coating.

13. The liner of claim 12, wherein the polymeric coating is a thermoplastic resin.

14. The liner of claim 13, wherein the thermoplastic resin is selected from the group consisting of polyethylene and polypropylene.

15. The liner of claim 1, wherein the third strip is provided over the gap.

16. The liner of claim 1, wherein the third strip is provided underneath the gap.

17. In a vehicle cargo area comprising a floor upon which cargo is supported and a vehicle frame provided underneath the floor, the improvement comprising providing a liner which prevents moisture from entering and yet allows moisture to exit said cargo area underneath said floor, said liner comprising a first strip of a waterproof material provided underneath the vehicle's floor, a second strip of a waterproof material provided underneath the vehicle's floor in spaced-apart, parallel relationship to said first strip so that a gap is provided therebetween and a third strip of a waterproof material provided underneath the vehicle's floor and covering the gap provided between said first and second strips, wherein means for removing moisture is provided between at least one of said first and third strips and said second and third strips.

18. In a vehicle for transporting cargo from one location to another comprising a cargo area having a floor upon which cargo is supported and a vehicle frame provided underneath the floor, the improvement comprising providing a liner which prevents moisture from entering and yet allows moisture to exit said cargo area underneath said floor, said liner comprising a first strip of a waterproof material provided underneath the vehicle's floor, a second strip of a waterproof material provided underneath the vehicle's floor in spaced-apart, parallel relationship to said first strip so that a gap is provided therebetween and a third strip of a waterproof material provided underneath the vehicle's floor and covering the gap provided between said first and second strips, wherein means for removing moisture is provided between at least one of said first and third strips and said second and third strips.

* * * * *